United States Patent [19]
Ardon et al.

[11] Patent Number: 5,226,042
[45] Date of Patent: Jul. 6, 1993

[54] METHOD FOR ESTABLISHING WIDEBAND COMMUNICATIONS THROUGH A TIME DIVISION SWITCHING SYSTEM

[75] Inventors: Menachem T. Ardon, Naperville; Robert C. Lee, Glen Ellyn, both of Ill.

[73] Assignee: AT&T Bell Laboratories, Murray Hill, N.J.

[21] Appl. No.: 832,537

[22] Filed: Feb. 7, 1992

[51] Int. Cl.$^5$ .............................................. H04J 3/02
[52] U.S. Cl. ......................................... 370/68; 370/53
[58] Field of Search .................... 370/53, 58.1, 63, 68

[56] References Cited

U.S. PATENT DOCUMENTS

| | | | |
|---|---|---|---|
| Re. 32.900 | 4/1989 | Orsic | 370/54 |
| 4,577,312 | 3/1986 | Nash | 370/84 |
| 4,603,415 | 7/1986 | Nakada et al. | 370/58.1 |
| 4,704,716 | 11/1987 | Bowers et al. | 370/63 |
| 4,885,738 | 12/1989 | Bowers et al. | 370/58.1 |
| 4,941,141 | 7/1990 | Hayano | 370/68 |

FOREIGN PATENT DOCUMENTS 0119843  9/1984  European Pat. Off. .

OTHER PUBLICATIONS

*AT&T Technical Journal*, "The 5ESS ® Switching System: Architectural Overview", Jul.-Aug. 1985, vol. 64 No. 6 Part 2, pp. 1339-1356.

P. J. Marino et al., "The AT&T Communications ISDN Plans", *IEEE International Conference on Communications*, 1985, vol. 1, Jun. 23-26, 1985, pp. 9.6.1-9.6.5.

"Integrated Services Digital Network (ISDN) Primary Rate Interface", Preliminary Technical Reference, PUB41459, AT&T Communications, Jun. 1985, Chapter IV, pp. 11-30.

"Customer Controlled Reconfiguration a Service Function of ACCUNET$^{SM}$ T1.5", Preliminary Technical Reference, PUB54015, AT&T Communications, Jan., 1984, pp.1-11.

R. B. Abbott et al., "Digital Access and Cross-Connect System—System Architecture", *National Telecommunications Conference*, vol. 1, Nov. 29-Dec. 3, 1981, pp. B1.2.1.-B1.2.7.

S. Andresen, "A Novel STS Structure", *Colloque Internation De Communication*, Paris, May, 1979, pp. 405-412.

H. Fukinuki et al., "Structure of Time Division Switching Network", *International Switching Symposium*, Kyoto, Japan, Oct. 25-29, 1976, pp. 411-1-1/411-1-8.

K. Gotoh et al., "Design Concepts of a Digital Switching System for Higher Performance", *IEEE National Telecommunications Conference*, Houston, Nov. 30--Dec. 4, 1980, vol. 1, pp. 19.2.1-19.2.5.

Nippon Denki K. K. et al., "Multiple Channel", *Patent Abstracts of Japan*, vol. 3, No. 54, (F-109), May 10, 1979, pp. 77e109.

*Primary Examiner*—Benedict V. Safourek
*Attorney, Agent, or Firm*—Ross T. Watland

[57] ABSTRACT

A method of establishing an N time slot connection through first and second, single-buffered time slot interchangers where the time slots interconnecting the two time slot interchangers, referred to herein as network time slots, are chosen in accordance with particular selection criteria such that all N time slots received by the first time slot interchanger in a single frame, are also transmitted from the second time slot interchanger in a single frame.

14 Claims, 9 Drawing Sheets

CASE 1
$j_i \geq k_i$

FIG. 6

CASE 2
$j_i < k_i$

FIG. 7

| i | ji | ki | xi |
|---|-----|-----|-----|
| 1 | 12  | 45  | 4   |
| 2 | 30  | 46  | 214 |
| 3 | 61  | 58  | 52  |
| 4 | 212 | 240 | 320 |

METHOD FOR ESTABLISHING WIDEBAND COMMUNICATIONS THROUGH A TIME DIVISION SWITCHING SYSTEM

TECHNICAL FIELD

This invention relates to telecommunications.

BACKGROUND AND PROBLEM

Most digital communication within the switched, telecommunications networks is limited to 64 kilobits per second due to the constraints imposed by existing switching systems and transmission facilities. In specific applications requiring greater bandwidth, several narrowband channels are combined to form a wideband channel, sometimes referred to as an $N \times DS0$ channel, where DS0 refers to a 64 kilobits per second channel and therefore an $N \times DS0$ channel is an integer multiple of 64 kilobits per second. A problem occurs when the data from grouped channels is not switched through a switching system in the same order that the data is received. This occurs when a time slot interchanger of the switching system causes some, but not all, of the time slot data of a given time division frame to be delayed and combined with the time slot data of another time frame. One solution to this problem is to provide double-buffered time slot interchangers where all the data from one frame is written into a first buffer while at the same time data is read out from a second buffer that was stored therein during the previous frame. The reading and writing of the first and second buffers alternates every frame. This solution works well but adds both the cost of the additional memory and one frame of transmission delay for each double-buffered time slot interchanger. In addition, the problem remains for the large number of existing switching systems with only single-buffered time slot interchangers.

Solution

The above problem is solved and a technical advance is achieved in accordance with the principles of the invention in a method of establishing an N time slot connection through first and second, single-buffered time slot interchangers where the time slots interconnecting the two time slot interchangers, referred to herein as network time slots, are chosen in accordance with particular selection criteria such that all N time slots received by the first time slot interchanger in a single frame, are also transmitted from the second time slot interchanger in a single frame.

A method in accordance with the invention establishes an N time slot connection through first and second time slot interchangers where $j1, j2 \ldots jN$ are the numbers associated with the N input time slots to the first time slot interchanger for the connection and $k1, k2 \ldots kN$ are the numbers associated with the N output time slots of the second time slot interchanger for the connection. For each integer i where $ji \geq ki$, a time slot number xi is selected with $xi > (ji + d)$ or $xi < (ki - d)$ and xi is an idle output time slot of the first time slot interchanger and also an idle input time slot of the second time slot interchanger, and with d being a positive integer or zero. For each integer i where $ji < ki$, a time slot number xi is selected with $xi < (ji - d)$ or $xi > (ki + d)$ and xi is an idle output time slot of the first time slot interchanger and also an idle input time slot of the second time slot interchanger. Once the time slots $x1, x2 \ldots xN$ are selected, the first time slot intercharger is controlled to connect input time slots $j1, j2 \ldots jN$ to the output time slots $x1, x2 \ldots xN$ of the first time slot interchanger. The second time slot interchanger is controlled to connect the input time slots $x1, x2 \ldots xN$ of the second time slot interchanger to the output time slots $k1, k2 \ldots kN$.

When N time slots $x1, x2 \ldots xN$ are not available meeting the above criteria—i.e., a blocking condition, a further method may be used where $ji > ki$ for all i. A time slot number $xi < ji - d$ and $xi > ki + d$ is selected for each integer i with xi being an idle output time slot of the first time slot interchanger and also being an idle input time slot of the second time slot interchanger. Alternatively, where $ji < ki$ for all i, a time slot number $xi > ji + d$ and $xi < ki - d$ is selected for each integer i with xi being an idle output time slot of the first time slot interchanger and also being an idle input time slot of the second time slot interchanger.

In the exemplary embodiment herein, the first and second time slot interchangers are single-buffered. In some applications, the above methods will not result in sufficiently low blocking probabilities. One solution to this is make the input time slots $j1, j2 \ldots jN$ and/or the output time slots $k1, k2 \ldots kN$ selectable by interposing a third time slot interchanger in front of the first time slot interchanger and/or interposing a fourth time slot interchanger after the second time slot interchanger. The third and fourth time slot interchangers are double-buffered. To reduce blocking, the selections are made such that for each integer i, the time slot number ji is as close as possible to the time slot number ki.

An alternative expression of the basic method of the invention relies on the definition for each integer i from 1 to N, of si as the smaller number of the two numbers ji and ki, and li as the larger number of the two numbers ji and ki. The N time slots $x1, x2 \ldots xN$ are selected such that for each xi, a data word received by the first time slot interchanger in time slot ji of a first frame of time slots is connected through to a second time slot interchanger and transmitted therefrom in time slot ki of a second frame of time slots immediately following the first frame. The data word is transmitted from the first time slot interchanger in a time slot xi which is between time slot $(li + d)$ of the first frame and time slot $(si - d)$ of the second frame, where di is a positive integer or zero.

DETAILED DESCRIPTION

The following description is arranged in two parts: (1) the AT&T 5ESS ® switch is described as it exists in the prior art; and (2) call processing in an exemplary method of the invention is described in terms of departures over the prior art system.

Prior Art System 1000

Figure 1:
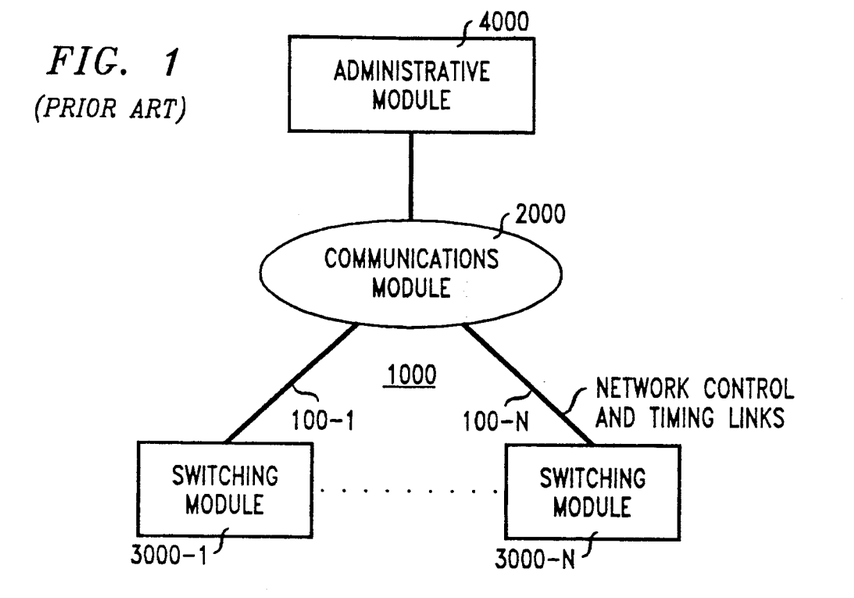
FIGS. 1-3 are diagrams of a prior art switching system.
Figure 2:
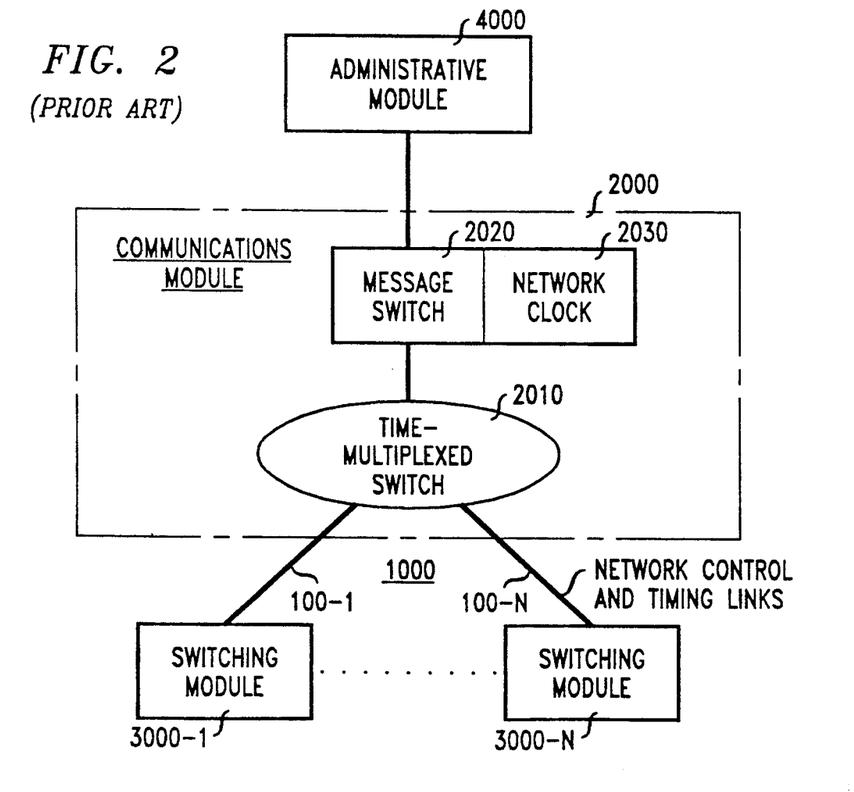
Figure 3:
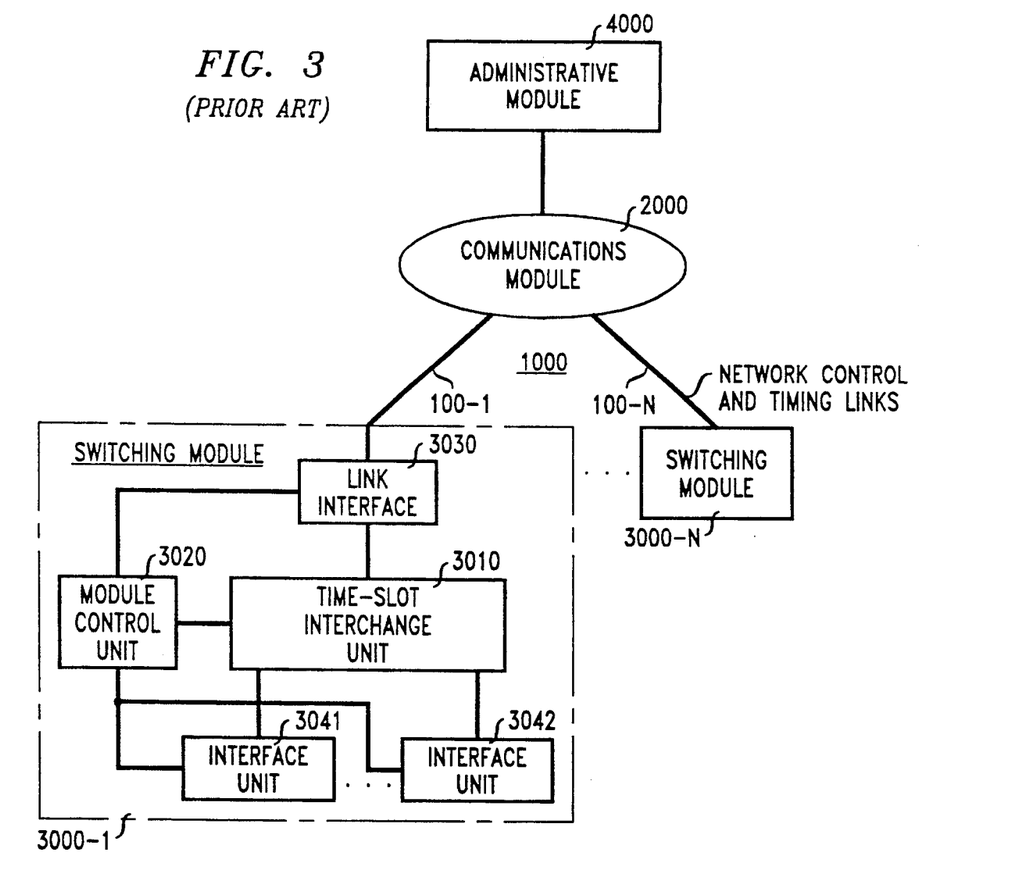

FIGS. 1-3 are used to describe the prior art switching system 1000. The AT&T Technical Journal, July-August 1985, Vol. 64, No. 6, Part 2, U.S. Pat. No. 4,322,843 issued to H. J. Beuscher et al. on Mar. 30, 1982, U.S. Pat. No. 4,683,584 issued to S. Chang et al. on Jul. 27, 1987 and U.S. Pat. No. 4,621,357 issued to S. Naiman et al. on Nov. 4, 1986 describe aspects of the system in detail.

Switching system 1000 (FIG. 1) has three major components: an administrative module (AM) 4000 that provides systemwide administration, maintenance, and resource allocation; a communications module (CM) 2000 that provides a hub for distributing and switching voice or digital data, control information, and synchronization signals; and a number of switching modules (SMs) 3000-1, 3000-N that perform local switching and control functions and that provide interfaces to subscriber lines and interexchange circuits.

AM 4000 provides the system-level interfaces required to operate, administer, and maintain system 1000. It performs functions that can most economically be done globally, such as common resource allocation and maintenance control. For reliability, AM 4000 includes fully duplicated processors and the two processors work in an active/standby configuration. In normal operation the active processor has control and, at the same time, keeps the data in the standby processor up to date. Thus when a fault occurs in the active processor, the standby processor is switched into service with no loss of data.

AM 4000 performs many call-processing support functions, including systemwide craft maintenance access, diagnostic and exercise control and scheduling, software recovery and initialization, and certain fault-recovery and error-detection functions best done on a centralized basis. Within AM 4000, there is error-checking circuitry for detecting and isolating faults. AM 4000 also performs administrative functions and provides software access to external data links and to disk storage (not shown).

The basic function of CM 2000 (FIG. 2) is to provide consistent communications between the SMs, and between AM 4000 and the SMs. A message switch (MSGS) 2020 transfers call-processing and administrative messages between the SMs and AM 4000, and between any two SMs. MSGS 2020 performs a packet-switching function within system 1000 utilizing the well-known X.25 level-2 protocol to transfer control messages through CM 2000 and its terminating network control and timing (NCT) links 100-1, 100-N. This protocol includes error detection, positive message acknowledgment, and message retransmission in the event of a transmission error. A network clock 2030 provides the clock signals that synchronize the time-division network. Clock 2030 is synchronized through an external source or runs on an internal reference basis with periodic updating.

System 1000 uses a time-space-time architecture. As illustrated in FIG. 3, a time-slot interchange unit (TSIU) in each SM performs the time-division switching; a time-multiplexed switch (TMS) 2010 in CM 2000 (FIG. 2) performs the time-shared space-division switching. At each interface unit (FIG. 3) the outputs from lines and trunks are converted into 16-bit time slots. These bits are used for signaling, control, and parity, and for binary-coded voice or data. The time slots are switched through the TSIU and time-multiplexed on NCT links to TMS 2010.

TMS 2010 (FIG. 2) is a single-stage switching network that provides the digital paths for switched connections between the modules and for control messages among modules. TMS 2010 interconnects the modules via the NCT links. Each NCT link carries 256 channels (time slots) of multiplexed data in a 32.768-Mb/s serial bit stream. One of the time slots carries control messages, and the remaining 255 time slots carry digitized voice or data. Two NCT links are associated with each switching module, thus allowing 512 time slots to be routed to and from TMS 2010. (However, only a single line 100-1 is shown in the drawing to represent both NCT links between SM 3000-1 and CM 2000.) Setting up a path between a line or trunk on two SMs involves finding an idle time slot on one of the NCT links to each SM. A path is then set up through TMS 2010 between the two NCT links using the selected time slot. The TSIU in each SM establishes a path between the selected NCT time slot and the peripheral time slot associated with the line or trunk. (Since the paths are bidirectional, one NCT time slot is needed for each direction of transmission. In the present embodiment however, the time slots for the two directions are selected to have the same number.)

One of the signaling bits of the 16-bit time slots on the NCT links to TMS 2010, referred to as the E-bit, is used for continuity verification between SMs after an inter-SM call has been set up through TMS 2010. For example, after a call between SM 3000-1 and SM 3000-N has been set up through TMS 2010 using a particular time slot, both SM 3000-1 and SM 3000-N begin transmitting a logic one E-bit in the particular time slot as a continuity signal and both also begin scanning the E-bit of the particular time slot received from the other SM. The call setup procedure is not considered complete until both SM 3000-1 and SM 3000-N have detected the E-bit continuity signal from the other SM.

SMs such as SM 3000-1 (FIG. 3) provide call-processing intelligence, the first stage of switching network, and line and trunk terminals. SMs differ in the types and quantities of interface equipment they contain, depending upon the characteristics of the lines or trunks terminating thereon. Certain equipment is however, common to all SMs. The common equipment includes a link interface 3030, a TSIU 3010, and a module control unit 3020. Link interface 3030 provides a two-way interface between each SM and TMS 2010 in CM 2000. Module control unit 3020 controls call processing, call distribution, and maintenance functions. A variety of interface units 3041, 3042 are available in system 1000. Line units provide interfaces to analog lines. Trunk units provide interfaces to analog trunks. Digital line trunk units provide interfaces to digital trunks and remote SMs, while digital carrier line units provide the interface to digital carrier systems. Integrated services line units provide interfaces to digital ISDN lines. Each SM can accommodate any mixture of these units, with up to 510 channels. Two time slots are used for control.

TSIU 3010 includes a signal processor, which handles address and signaling information and a control interface, which distributes control signals to and from the interface units. TSIU 3010 switches time slots between the interface units in an SM and connects time slots from the interface units to time slots on NCT links. TSIU 3010 switches 512 time slots—256 from each of the NCT links between SM 3000-1 and CM 2000—and 512 peripheral time slots from the interface units. TSIU 3010 can connect any of its 512 peripheral time slots to any other peripheral time slot, or to any time slot of either NCT link to CM 2000.

System 1000 is a time division switching system where the switching function is distributed to the plurality of SMs 3000-1, 3000-N, each connected to a number of lines and/or trunks. Each SM provides connections among the lines and trunks connected to that module. Calls involving lines or trunks connected to different SMs are completed through TMS 2010 that interconnects the SMs. Each SM includes a control unit, e.g., module control unit 3020, that controls the switching function of that SM. System 1000 also includes a central control, e.g., AM 4000, that controls the switching function of TMS 2010. All calls within system 1000 require the selection of what is referred to as a network time slot. For inter-module calls, the network time slot is used for transmission from one SM, through TMS 2010, to another SM. The same network time slot is used for both directions of transmission. For intra-module calls, the network time slot is used within the SM to connect one line or trunk to another line or trunk. Two network time slots are used for intra-module calls, one for each transmission direction. Although the call processing function is distributed in system 1000 in that the real-time intensive tasks associated with calls, e.g., signal processing, are performed by the switching module control units, the functions of selecting the network time slot and setting up the TMS 2010 path if the call is an inter-module call, are centralized, being performed by AM 4000.

Recall that there are 512 channels (time slots) TS0 through TS511 between a given SM and TMS 2010 (FIG. 2) and that setting up a path for an inter-module call between SM 3000-1 and SM 3000-N involves finding a channel that is available on link 100-1, for example TS44, and that has a corresponding available channel TS44 on link 100-N. AM 4000 stores an availability bit map for each of the links 100-1 through 100-N for use in performing the network time slot selection function. For each time slot marked not available on a given link, AM 4000 also stores information defining the connection through TMS 2010 to one of the other links. Network time slots are again marked available and the connection information deleted in AM 4000 after a call ends. (For reasons of efficient processing, this operation may be deferred until a predetermined number of call disconnects, e.g., 15, occur or a predefined time elapses.) However, the path or connection through TMS 2010 is not removed after the call ends. As described in the above-referenced U.S. Pat. No. 4,621,357 of S. Naiman et al., TMS 2010 removes connections only as necessary to establish a new connection. The information defining established TMS 2010 connections is stored only within TMS 2010 in system 1000, and the network time slot selection function (also referred to herein as the available path selection function) is performed without reference to such information.

Exemplary Method of the Invention

Figure 4:
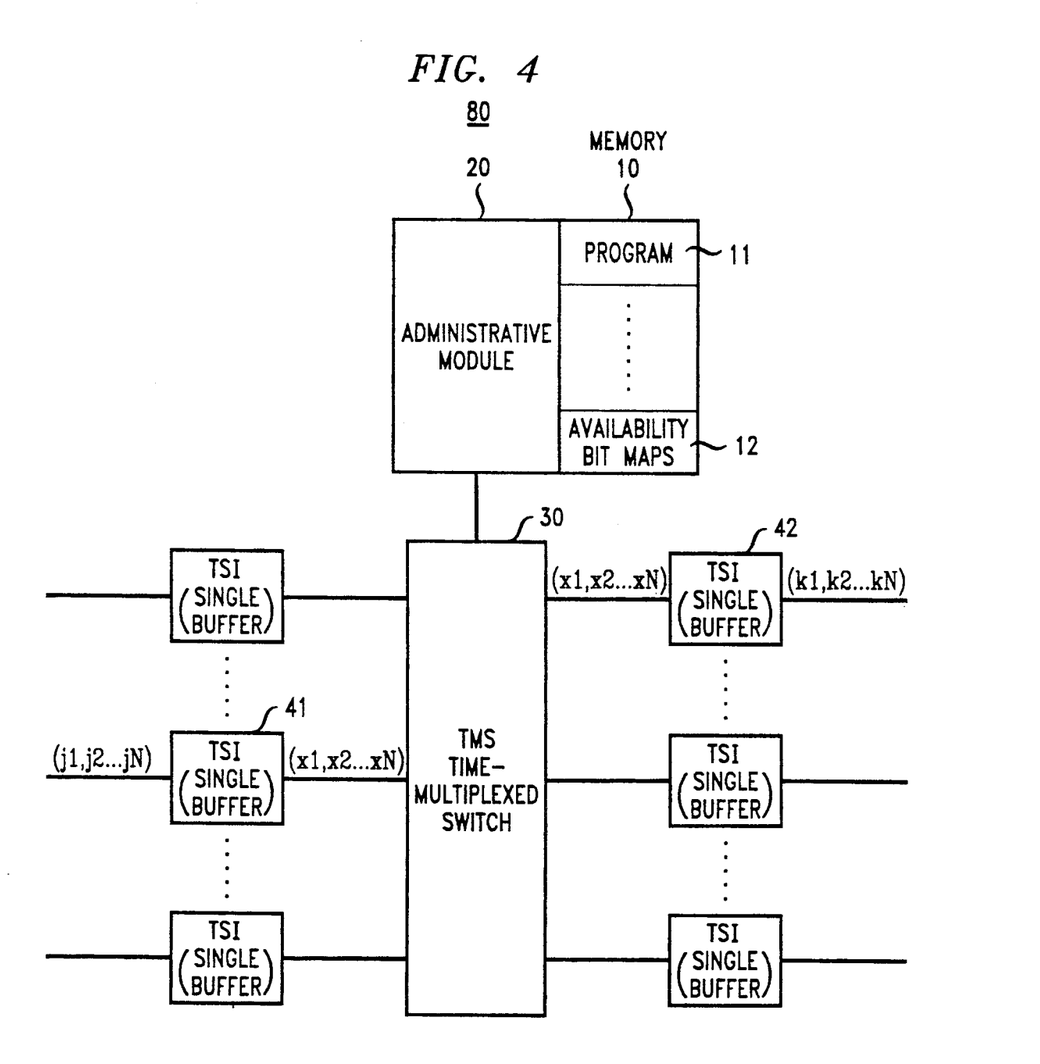
FIG. 4 is a block diagram of a switching system utilizing an exemplary call processing method of the present invention.

FIG. 4 is a block diagram of switching system 80 implementing an exemplary method of the present invention. The hardware elements of system 80 are substantially the same as those of switching system 1000 (FIGS. 1-3); however the drawing of FIG. 4 includes only the time-multiplexed switch 30 portion of the communications module and the time slot interchangers shown in FIG. 4 are unidirectional and are therefore shown on either side of time-multiplexed switch 30 to aid in the explanation of the present invention. One pair of unidirectional time slot interchangers corresponds to one of the bidirectional time-slot interchange units 3010 of FIG. 3.

Figure 5:
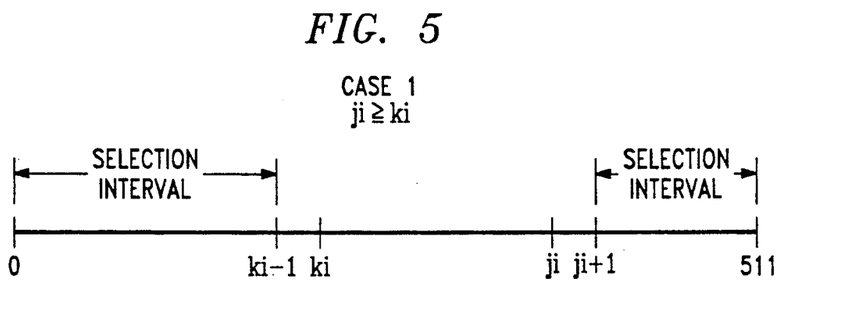
FIG. 5 and 6 illustrate time slot selection intervals useful in performing the path hunt function in the switching system of FIG. 4.
Figure 6:
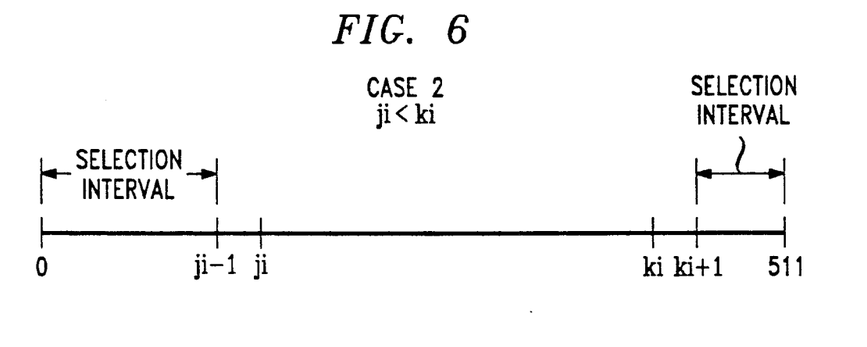

Program 11 stored in administrative module 20 of system 80 is adapted to perform path hunts for $N \times DS0$ calls. Note that the time slot interchangers, e.g. 41, 42, in the system are single buffered. In order to establish an $N \times DS0$ call between the input time slots j1, j2 ... jN of time slot interchanger 41 and the output time slots k1, k2 ... kN of time slot interchanger 42, N idle network time slots x1, x2 ... xN must be determined. The selection intervals used in accordance with the present invention to select network time slot xi are shown in FIGS. 5 and 6. FIG. 5 depicts Case 1 where $ji > = ki$. In Case 1, an idle network time slot xi is selected either between 0 and $ki-1$ or between $ji+1$ and 511. In Case 2 where $ji < ki$ (FIG. 6), an idle network time slot xi is selected either between 0 and $ji-1$ or between $ki+1$ and 511. More generally, the FIG. 5 intervals may be expressed as between 0 and $ki-d$ and between $ji+d$ and 511 and the FIG. 6 intervals may be expressed as between 0 and $ji-d$ and between $ki+d$ and 511, where d may be zero or a positive integer. In the present embodiment, $d=1$ because of the delay characteristics of the time slot interchangers. The exemplary method of the invention is usable in system 1000 (FIGS. 1-3) to select the network time slot used for both transmission directions of an inter-module call as well as to select each of the two network time slots used for an intra-module call.

An alternative way of expressing the selection intervals is to denote si as the smaller number of the two numbers ji and ki, and li as the larger number of the two numbers ji and ki. An idle network time slot xi is found which is between time slot $(li+d)$ of a first frame and time slot $(si-d)$ of the second frame.

Call blocking may occur using the above method. When such blocking occurs, a further method may be used if $ji > ki$ for all i or if $ji < ki$ for all i. If $ji > ki$ for all i, network time slots xi may be selected, if available, such that $xi < ji-d$ and $xi > ki+d$. If $ji < ki$ for all i, network time slots xi may be selected, if available, such that $xi > ji+d$ and $xi < ki-d$.

Figure 7:
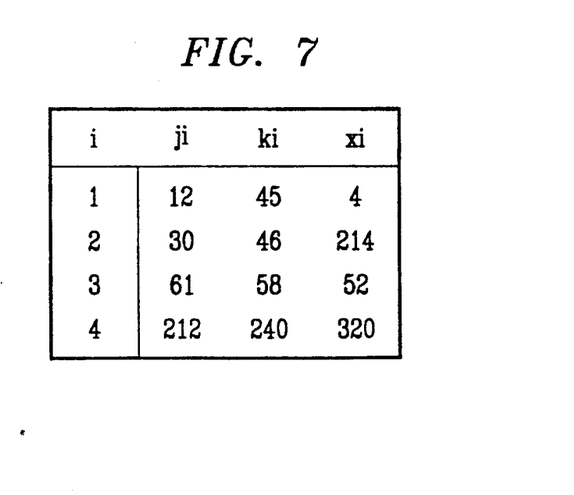
FIG. 7 illustrates the results of the exemplary path hunt method of the present invention for a $4 \times DS0$ call.

The path hunt results for a $4 \times DS0$ call are shown in FIG. 7. The selection intervals of Case 1 were applied for $i=3$, and $x3=52$ was selected from the interval between 0 and 57. The selection intervals of Case 2 were applied for $i=1,2,4$. Network time slot $x1=4$ was selected from the interval between 0 and 11, network time slot $x2=214$ was selected from the interval between 47 and 511, and network time slot $x4=320$ was selected from the interval between 241 and 511.

Figure 8:
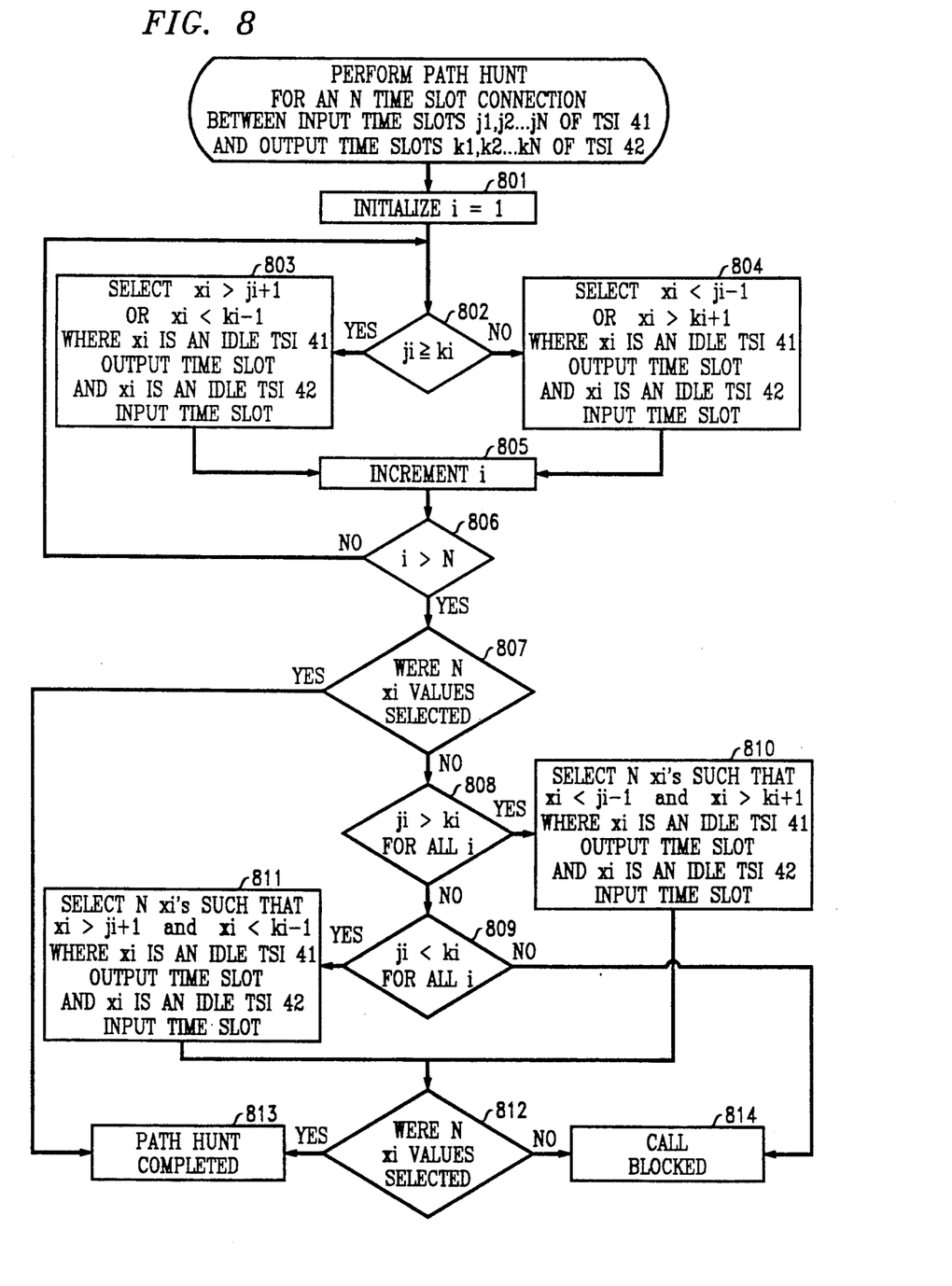
FIG. 8 is a flow chart of the exemplary path hunt program of the present invention.

FIG. 8 provides the flow chart for the $N \times DS0$ path hunt program in accordance with the invention. Blocks 801 through 806 implement the primary method with selection intervals as depicted in FIGS. 5 and 6. Blocks 807 through 814 implement the further method when the primary method is unsuccessful in obtaining N network time slots.

Figure 9:
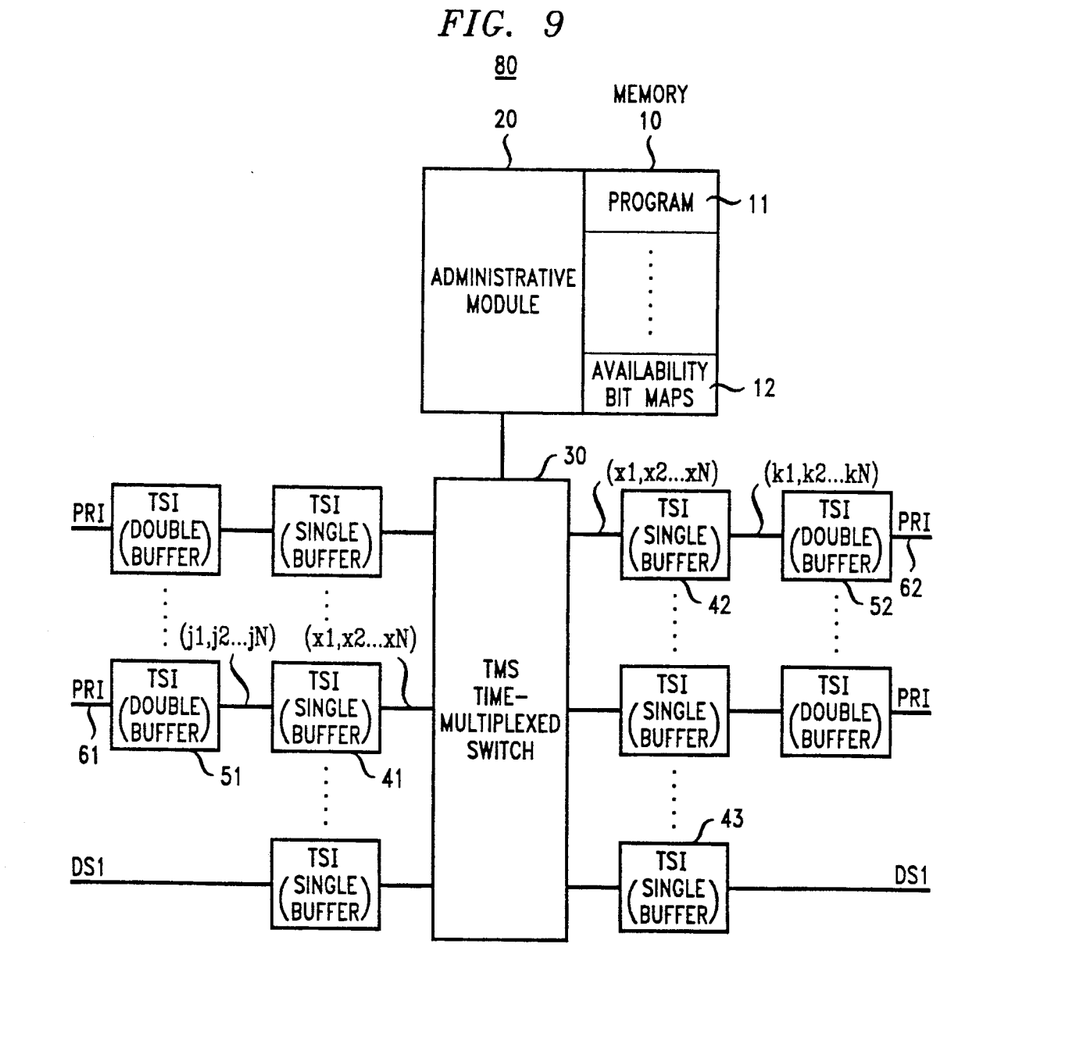
FIG. 9 is an alternative embodiment of the system of FIG. 4; and illustrating an example call between two primary rate interfaces.

In some applications, the blocking probabilities obtained using the program of FIG. 8 may be unacceptably high. One solution to this is to make either or both of the time slot sets ji and ki selectable. This may be done through the use of additional time-slot interchangers, which are themselves double-buffered such that they do not introduce any frame misalignment of time slots. As shown in FIG. 9, double-buffered time slot interchangers are interposed between the single-buffered time slot interchangers and primary rate ISDN interfaces. DS1 trunks are connected directly to the single-buffered time-slot interchangers.

Figure 10:
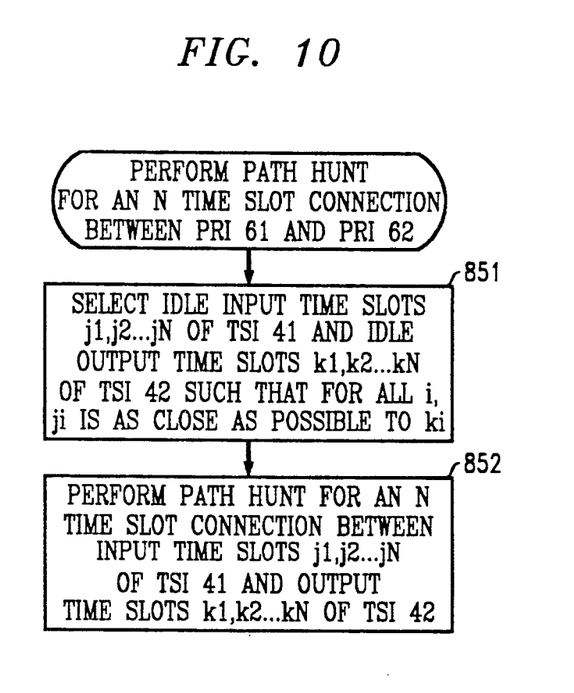
FIG. 10 is a flow chart of an exemplary path hunt program as applicable to the example call of FIG. 9.

FIG. 10 is the path hunt program flow chart for an N time slot connection between primary rate interfaces 61 and 62 of FIG. 9. In block 851, the time slots $j1, j2 \ldots jN$ of time slot interchanger 41 and the time slots $k1, k2 \ldots kN$ of time slot interchanger 42 are chosen such that for all i, ji is as close as possible to ki. Then in block 852 the program of FIG. 8 is performed.

Figure 11:
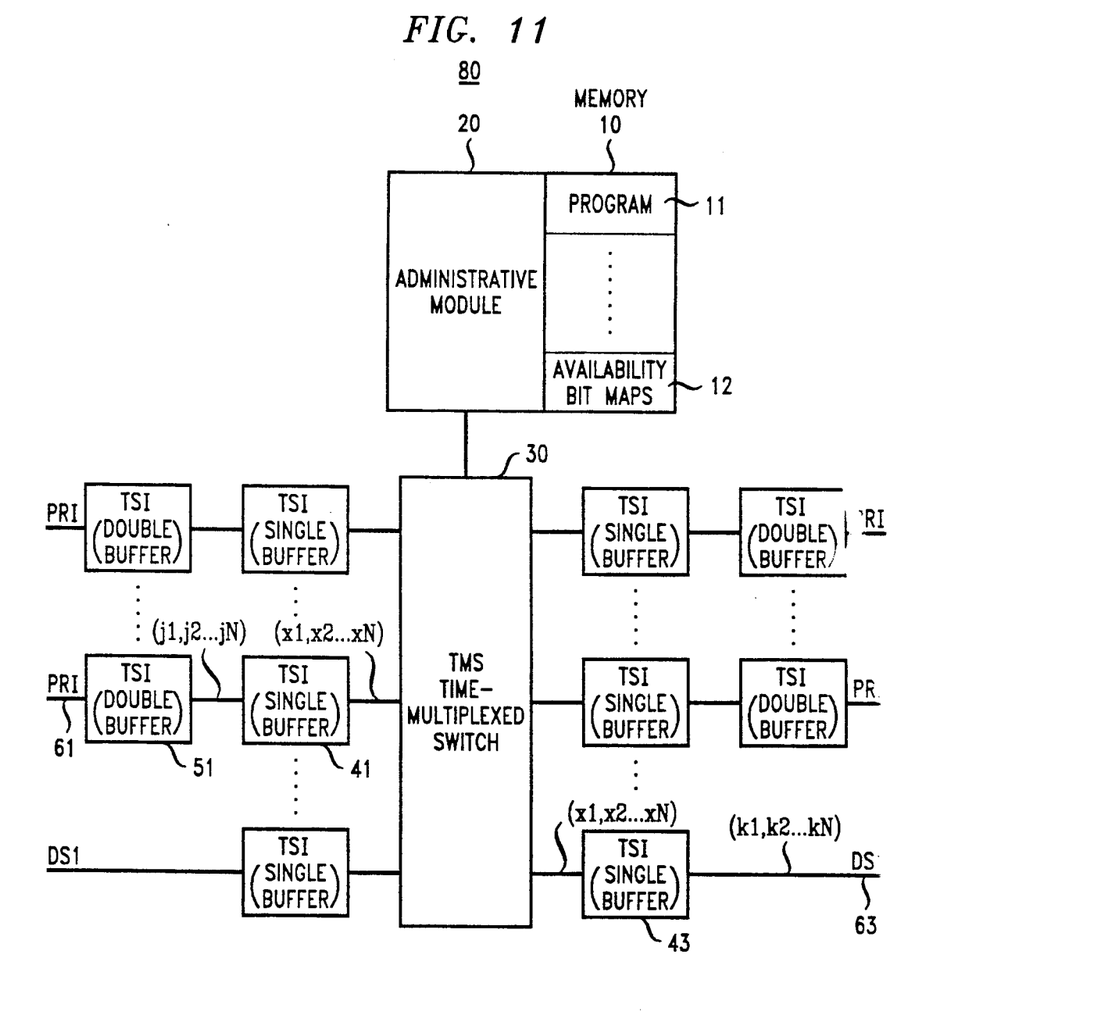
FIG. 11 is the same FIG. 9 alternative embodiment illustrating an example call between a primary rate interface and a DS1 trunk.
Figure 12:
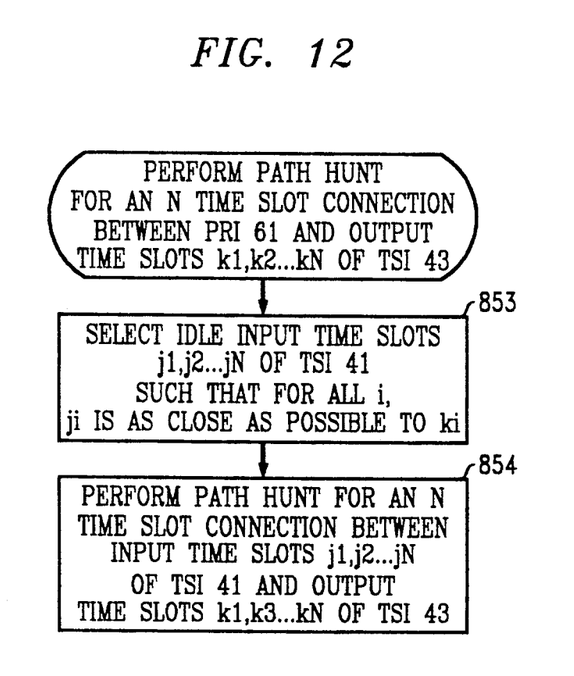
FIG. 12 is a flow chart of an exemplary path hunt program as applicable to the example call of FIG. 11.

FIG. 12 is the path hunt program flow chart for an N time slot connection between primary rate interface 61 and output time slots $k1, k2 \ldots kN$ of time slot interchanger 43 for connection to DS1 trunk 63 as shown in FIG. 11. In block 853, the time slots $j1, j2 \ldots jN$ of time slot interchanger 41 are chosen such that for all i, ji is as close as possible to ki. Then in block 854 the program of FIG. 8 is performed.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A method of establishing an N time slot connection through first and second time slot interchangers, with the output of said first time slot interchanger connected to the input of said second time slot interchanger, where $j1, j2 \ldots jN$ are the numbers associated with the N input time slots to said first time slot interchanger for said connection and $k1, k2 \ldots kN$ are the numbers associated with the N output time slots of said second time slot interchanger for said connection, with i being a positive integer index $i < = N$, said method comprising A) for each integer i where $ji > = ki$, select a time slot number $xi > (ji+d)$ or $xi < (ki-d)$ with xi being an idle output time slot of said first time slot interchanger and also being an idle input time slot of said second time slot interchanger, and with d being a positive integer or zero, B) for each integer i where $ji < ki$, select a time slot number $xi < (ji-d)$ or $xi > (ki+d)$ with xi being an idle output time slot of said first time slot interchanger and also being an idle input time slot of said second time slot interchanger, C) controlling said first time slot interchanger to connect input time slots $j1, j2 \ldots jN$ to the output time slots $x1, x2 \ldots xN$ of said first time slot interchanger, and D) controlling said second time slot interchanger to connect the input time slots $x1, x2 \ldots xN$ of said second time slot interchanger to output time slots $k1, k2 \ldots kN$.

2. A method in accordance with claim 1 further comprising

E) where N time slots $x1, x2 \ldots xN$ are not available meeting the criteria specified in steps A) and B), and where $ji > ki$ for all i, selecting, before step C), a time slot number xi such that $xi < ji-d$ and $xi > ki+d$ for each integer i with xi being an idle output time slot of said first time slot interchanger and also being an idle input time slot of said second time slot interchanger, and F) where N time slots $x1, x2 \ldots xN$ are not available meeting the criteria specified in steps A) and B), and where $ji < ki$ for all i, selecting, before step C), a time slot number xi such that $xi > ji-d$ and $xi < ki-d$ for each integer i with xi being an idle output time slot of said first time slot interchanger and also being an idle input time slot of said second time slot interchanger.

3. A method in accordance with claim 1 wherein a third time slot interchanger is connected to the input of said first time slot interchanger, said method comprising prior to step A), selecting for each integer i, the time slot number ji, with ji being an idle output time slot of said third time slot interchanger, and controlling said third time slot interchanger to connect N input time slots to the output time slots $j1, j2 \ldots jN$ of said third time slot interchanger.

4. A method in accordance with claim 3 where for each integer i, the time slot number ji is selected to be as close as possible to ki.

5. A method in accordance with claim 3 where said first and second time slot interchangers are single buffered and said third time slot interchanger is double buffered.

6. A method in accordance with claim 1 wherein a third time slot interchanger is connected to the output of said second time slot interchanger, said method comprising prior to step A), selecting for each integer i, the time slot number ki, with ki being an idle input time slot of said third time slot interchanger, and controlling said third time slot interchanger to connect the input time slots $k1, k2 \ldots kN$ of said third time slot interchanger to N output time slots.

7. A method in accordance with claim 6 where for each integer i, the time slot number ki is selected to be as close as possible to ji.

8. A method in accordance with claim 6 where said first and second time slot interchangers are single buffered and said third time slot interchanger is double buffered.

9. A method in accordance with claim 1 wherein the output of a third time slot interchanger is connected to the input of said first time slot interchanger, the input of a fourth time slot interchanger is connected to the output of said second time slot interchanger, said method comprising prior to step A), selecting for each integer i, the time slot numbers ji and ki, with ji being an idle output time slot of said third time slot interchanger, ki being an idle input time slot of said fourth time slot interchanger, controlling said third time slot interchanger to connect N input time slots to the output time slots $j1, j2 \ldots jN$ of said third time slot interchanger, and controlling said fourth time slot interchanger to connect the input time slots k1, k2 ... kN of said fourth time slot interchanger to N output time slots.

10. A method in accordance with claim 9 where for each integer i, the time slots ki and ji are selected to be as close as possible to each other.

11. A method in accordance with claim 9 where said first and second time slot interchangers are single buffered and said third and fourth time slot interchangers are double buffered.

12. A method in accordance with claim 1 with said output of said first time slot interchanger being connected to said input of said second time slot interchanger via switch means.

13. A method of establishing an N time slot connection through first and second time slot interchangers, with the output of said first time slot interchanger connected to the input of said second time slot interchanger, where j1, j2 ... jN are the numbers associated with the N input time slots to said first time slot interchanger for said connection, k1, k2 ... kN are the numbers associated with the N output time slots of said second time slot interchanger for said connection, with i being a positive integer index with $i <= N$, where for each integer i from 1 to N, si is the smaller number of the two numbers ji and ki and li is the larger number of the two numbers ji and ki, said method comprising selecting N time slots x1, x2 ... xN where for each xi, a data word received by the first time slot interchanger in time slot ji of a first frame of time slots is connected through to a second time slot interchanger and transmitted therefrom in time slot ki of a second frame of time slots immediately following said first frame, and where the data word is transmitted from said first time slot interchanger in a time slot xi which is between time slot (li+d) of said first frame and time slot (si−d) of said second frame, where d is a positive integer or zero.

14. A method in accordance with claim 13 with said output of said first time slot interchanger being connected to said input of said second time slot interchanger via switch means.

* * * * *

UNITED STATES PATENT AND TRADEMARK OFFICE
CERTIFICATE OF CORRECTION

PATENT NO. : 5,226,042
DATED      : Jul. 6, 1993
INVENTOR(S) : Menachem T. Ardon, et al It is certified that error appears in the above-indentified patent and that said Letters Patent is hereby corrected as shown below:

Column 8, lines 8 and 9, claim 2, "and xi > - ki + d" should be "and xi > ki + d"

Column 8, line 16, claim 2, "that xi > ji - d" should be "that xi > ji + d"

Signed and Sealed this

Twelfth Day of April, 1994

Attest:

BRUCE LEHMAN

*Commissioner of Patents and Trademarks*

*Attesting Officer*